March 16, 1943.  F. L. SANNA ET AL  2,313,894
INJECTOR APPARATUS
Filed Aug. 28, 1941   4 Sheets-Sheet 1
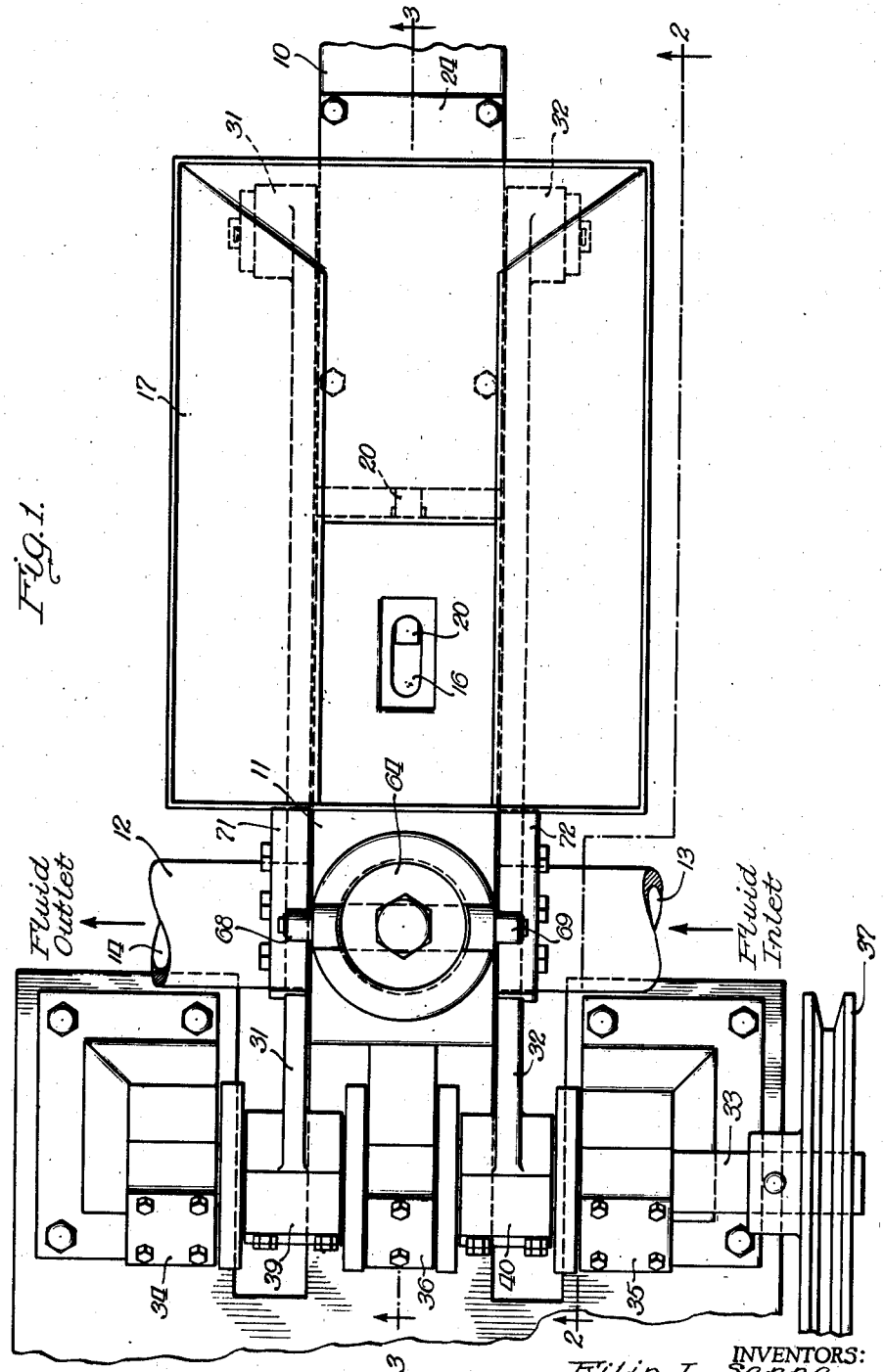

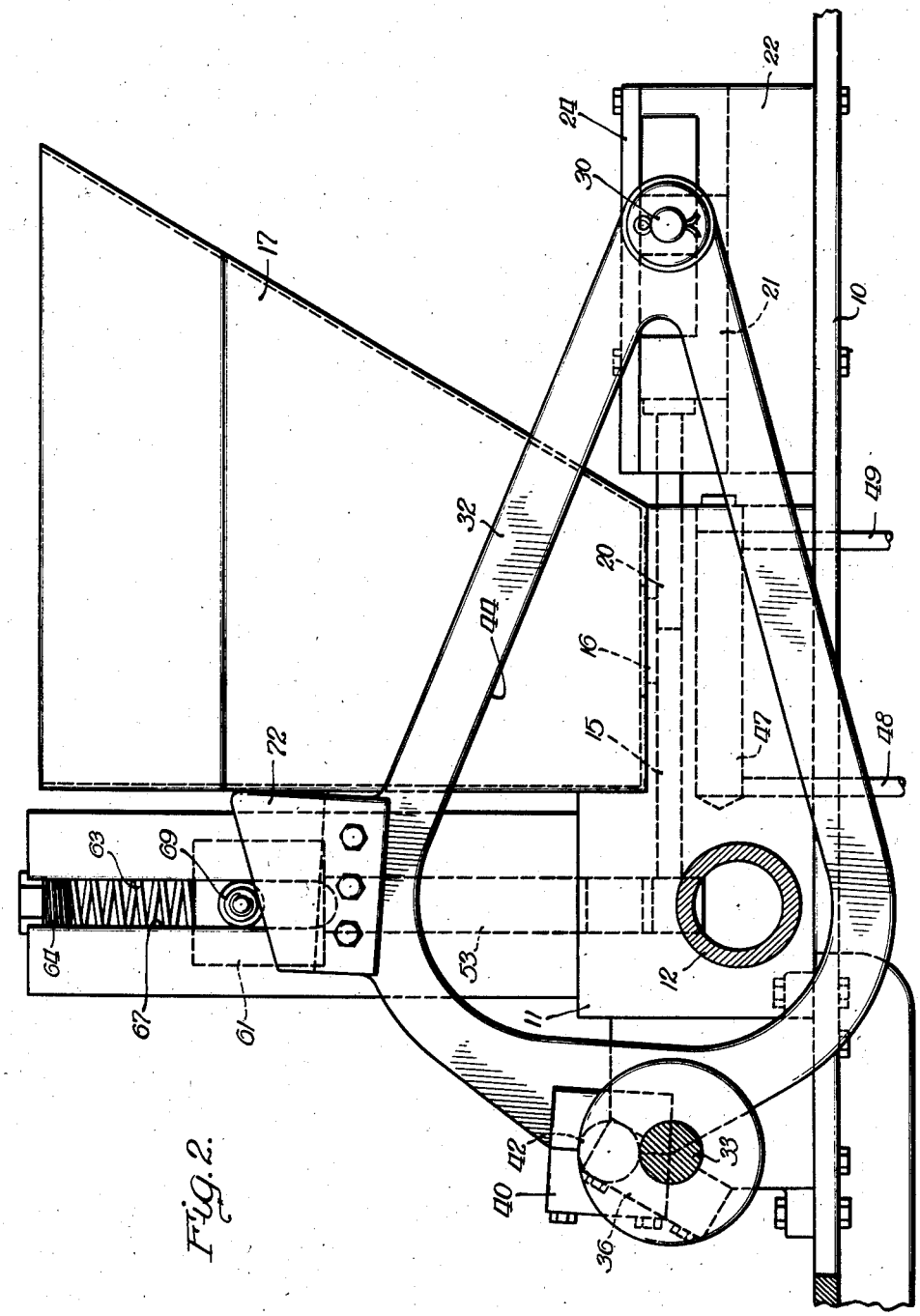

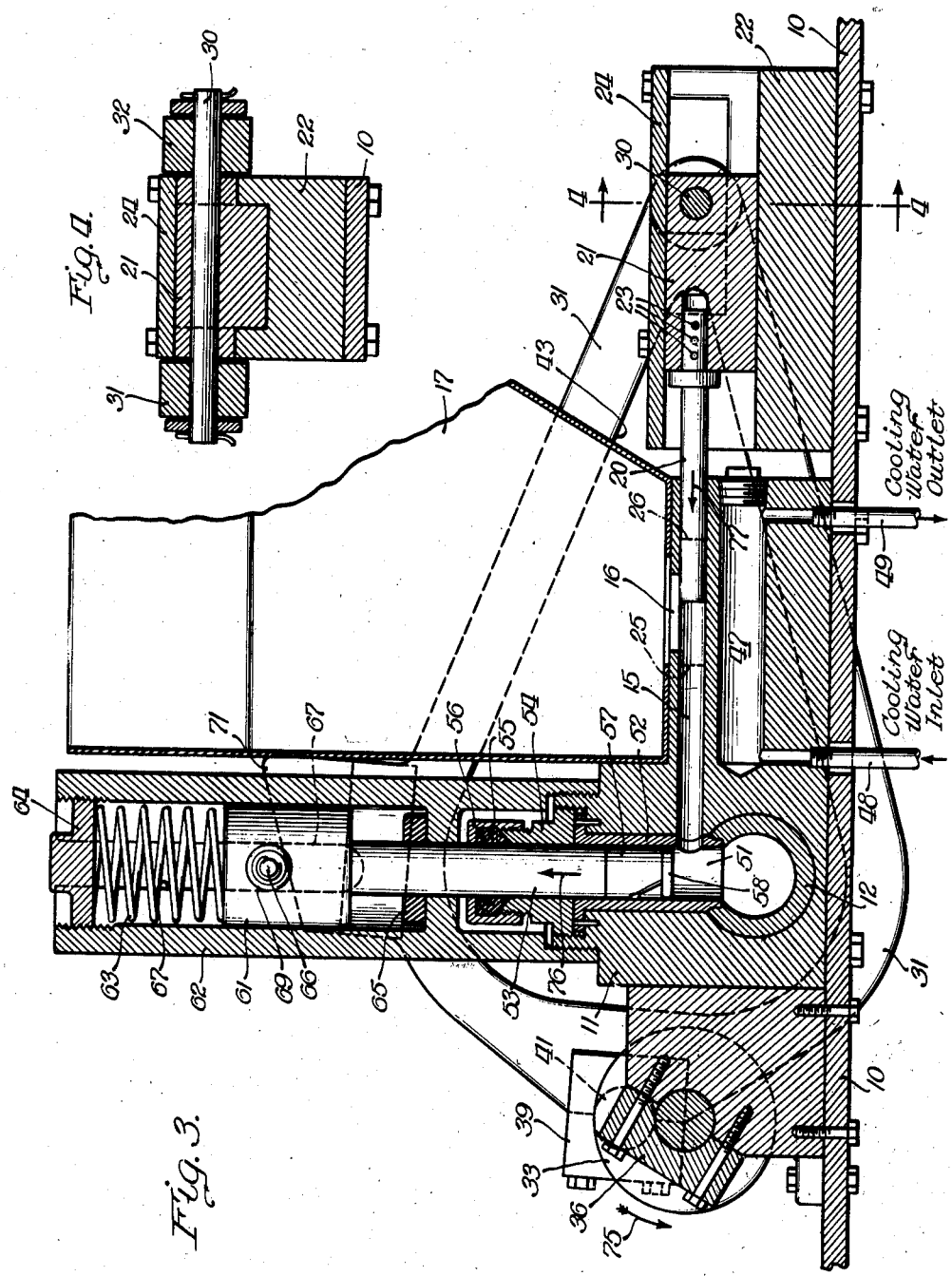

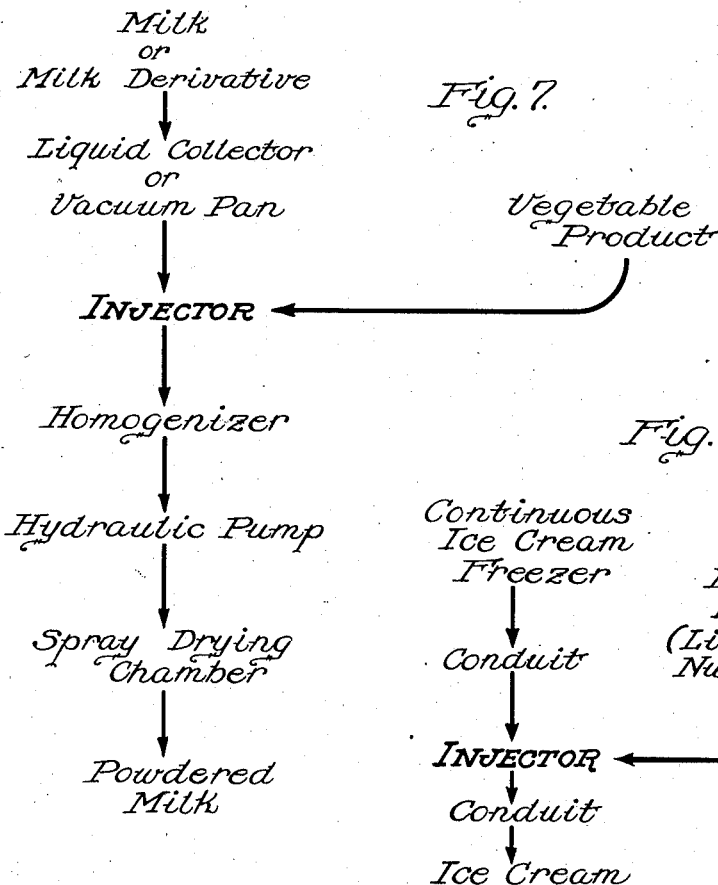
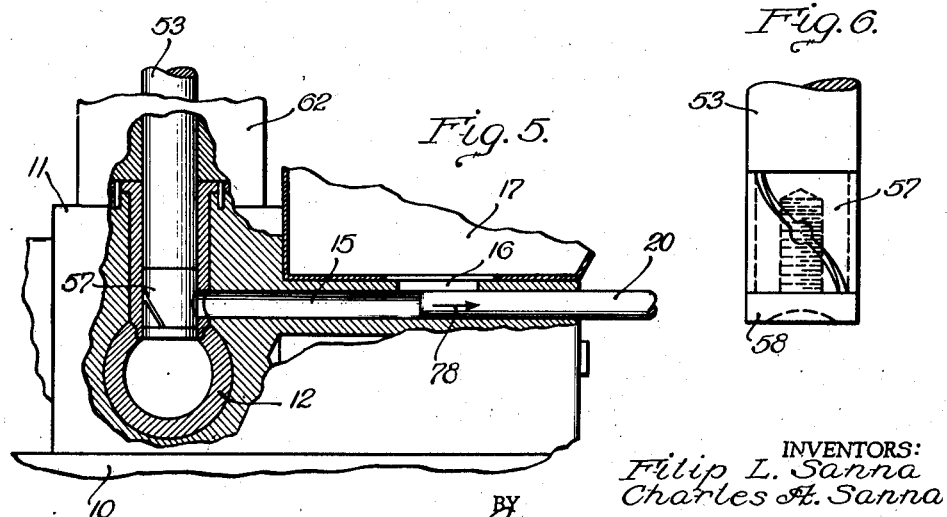

Patented Mar. 16, 1943

2,313,894

UNITED STATES PATENT OFFICE 2,313,894

INJECTOR APPARATUS

Filip L. Sanna, Madison, Wis., and Charles Albert Sanna, Gary, Ind., assignors to Sanna Dairy Engineers, Madison, Wis., a corporation of Wisconsin Application August 28, 1941, Serial No. 408,602

1 Claim. (Cl. 107—1)

Our invention relates, generally, to the injection of material into a conduit which is carrying a material under pressure and it has particular relation to the injection of a foodstuff into a conduit carrying a milk product.

Our invention has for one of its objects the provision of means for carrying out the method of processing milk disclosed in the copending application of Filip L. Sanna, Serial No. 404,833, filed July 31, 1941. As disclosed in this application psyllium seed husks are combined with a milk product while it is being processed to powdered milk. This material is combined with a milk product so that the powdered milk can be used more satisfactorily in ice cream mixes so as to control the water of hydration thereof in the final form. The present invention has particularly to do with the mechanical means for injecting the foodstuff such as psyllim seed husks into the milk product.

Another object of our invention is to provide for injecting a solid, semi-solid or liquid foodstuff into a conduit through which a milk product flows under pressure.

Another object of our invention is to provide for preventing the flow of the milk product out of the conduit into the injector apparatus.

Still another object of our invention is to provide a seal of the material being injected between the milk product in the conduit and the supply of foodstuff being injected into the same.

A further object of our invention is to correlate the injection of the foodstuff into the milk product with the cutting off of the connection between the conduit containing the milk product under pressure and the passageway through which the foodstuff is injected into the conduit.

Other objects of our invention will, in part, be obvious and in part appear hereinafter.

For a more complete understanding of the nature and scope of our invention reference can be had to the following detailed description taken in connection with the accompanying drawings in which:

Figure 1 is a top plan view of a concrete embodiment of the injector apparatus constructed according to our invention;

Figure 2 is a view taken along the line 2—2 of Figure 3; certain parts being shown in section and other parts being shown in side elevation;

Figure 3 is a detail sectional view taken along the line 3—3 of Figure 1;

Figure 4 is a detail sectional view taken along the line 4—4 of Figure 3;

Figure 5 is a view, partly in side elevation and partly in section, showing the relationship of certain parts of the injector different from the showing in Figure 3;

Figure 6 is a view, in side elevation, of the lower end of the cutoff or valve plunger; and Figures 7 and 8 show different flow sheets which can be used in practicing our invention.

Referring now particularly to Figures 1, 2, and 3 of the drawings, it will be observed that the reference character 10 designates a suitable support member or frame base that is arranged to carry an injector body or frame 11 preferably formed of mild steel. The frame 11 is arranged to receive therethrough a conduit 12 which, as shown in Figure 1, has an inlet 13 and an outlet 14. It will be understood that a fluid, such as a milk product, flows through the conduit 12. As more fully described in the copending application of Filip L. Sanna, referred to hereinbefore, the conduit 12 may interconnect the liquid collector of the Gray-Jensen powdered milk process or the vacuum pan of the Rogers powdered milk process and the homogenizer used in both processes.

The frame 11 is provided with a passageway 15 which communicates at one end with the conduit 12 and at the other end through an aperture 16 with a hopper 17 which is arranged to hold the foodstuff that is to be injected into the liquid milk product in the conduit 12. In order to feed the foodstuff, such as psyllium seed husks and sugar in dry granular form, a plunger 20, preferably formed of bronze, is slidably mounted in the passageway 15 and is arranged to be reciprocated by a crosshead 21, of mild steel, that in turn is slidably mounted on a cast brass crosshead bearing 22. The plunger 20 is provided with apertures 23 for receiving a pin to hold the plunger 20 in different positions with respect to the crosshead 21. By this means the position of the plunger 20 in the passageway 15 can be varied somewhat with respect to the crosshead 21. Alternatively, different lengths of plunger 20 can be employed if desired. A cover 24 is secured by suitable means to the crosshead bearing 22 for holding the crosshead 21 in place thereon.

The limit of forward movement of the plunger 20 is indicated by the broken line 25, while the broken line 26 indicates the limit of reverse movement for one length of the plunger 20 or one position thereof with respect to the crosshead 21. It will be understood that the space in the passageway 15 between the broken line 25 and the end adjacent the conduit 12 will normally be filled with the foodstuff from the hopper 17, thereby forming a seal between the conduit 12 and the hopper 17 which, in the absence of other means to be described hereinafter, prevents the escape of the liquid milk product through the passageway 15 into the hopper 17. This is highly desirable since the operation of the injector apparatus would be seriously impaired if the liquid milk product were permitted to fill or partially fill the passageway 15.

Extending through the crosshead 21 is a crosshead pin 30 to which are rockably secured connecting members 31 and 32 which are connected at their opposite ends to a crankshaft 33 that may be formed of mild steel. The crankshaft 33 is journaled in end bearings 34 and 35 and a center bearing 36. It is provided with a pulley 37, Figure 1, at one end over which a belt driven by a suitable mechanism, such as an electric motor, can be placed. It will be understood that other driving means can be employed if desired. The connecting members 31 and 32 are provided with bearings 39 and 40, respectively, which are journaled on crank pins 41 and 42 eccentrically located on and integrally formed with the crankshaft 33.

The connecting members 31 and 32 are preferably formed of steel plate and are provided with openings 43 and 44 therein so as to reduce their weight and also to clear the conduit 12 which extends through them.

If desired, the frame 11 can be provided with a cooling chamber 47 through which cooling water can be circulated from an inlet conduit 48 and out of an outlet conduit 49.

It will be observed that the passageway 15 opens into a passageway 51 in the frame 11 so that the two passageways intersect substantially at right angles. A plunger sleeve 52, preferably formed of stainless steel, is located in the passageway 51 and is arranged to receive a slidably mounted plunger 53 that is preferably formed of bronze. A packing gland 54 together with packing 55 and a packing nut 56 cooperate with the plunger 53 to prevent escape of the fluid milk product in the conduit 12 past the plunger 53.

As is more clearly shown in Figure 6 of the drawings, the plunger 53 at its lower end is provided with a split plunger ring 57 that is held in place by a suitable headed screw 58, which is threaded into the lower end of the plunger 53. The plunger ring 57 serves to seal the end of the passageway 15 where it joins the passageway 51 through the plunger sleeve 52 when the plunger 53 is in its lowermost position, so as to prevent the flow of the liquid milk product from the conduit 12 back through the passageway 15. This seal is augmented by the fact that the passageway 15 from the passageway 51 in the sleeve 52 to the forward end of the stroke of the plunger 20 as indicated by the broken line 25 is filled with the foodstuff that is to be injected into the liquid milk product. This foodstuff forms the only seal for preventing escape of the fluid milk from the conduit 12 when the plunger 53 is moved upwardly sufficiently far to uncover the end of the passageway 15.

At its upper end the plunger 53 is provided with an integrally formed head portion 61 that is arranged to reciprocate in a guide member 62 that is preferably formed of stainless steel. A coil compression spring 63, located between the upper end of the head 61 and the underside of a threaded spring adjusting cap 64, serves to bias the plunger 53 downwardly to the position shown in Figure 5 of the drawings. The downward movement of the plunger 53 is cushioned by a shock absorber 65 in the form of a suitable synthetic elastic material such as "neoprene."

It will be obvious that the movement of the plunger 53 should be correlated with the movement of the plunger 20 so as to effectively inject the foodstuff from the hopper 17 into the fluid milk in the conduit 12 and prevent the latter from escaping through the passageway 15 into the hopper 17. With this end in view, a follower pin 66, preferably formed of nickel steel, extends through the head portion 61 of the plunger 53 and through suitable slots 67 in the side wall of the guide member 62. Rollers 68 and 69, preferably formed of hardened tool steel, are provided on the ends of the follower pin 66 and are arranged to cooperate with cam members 71 and 72, preferably formed of hardened tool steel, which are carried by the connecting members 31 and 32, respectively.

In operation, it will be understood that the pulley 37 rotates the crankshaft 33 at such a speed as to introduce the desired amount of foodstuff from the hopper 17 into the conduit 12. The crankshaft 33 is rotated in the direction indicated by the arrow 75 on Figure 3 of the drawings and, with the parts in the relation there shown, the plunger 53 is being moved upwardly as indicated by the arrow 76 while the plunger 20 is moving forwardly as indicated by the arrow 77. During this phase of the operation, the liquid milk product in the conduit 12 is prevented from escaping through the passageway 15 by the seal which is provided by the foodstuff in this passageway in front of the plunger. Continued movement of the crankshaft 33 in the direction indicated by the arrow 75 finally results in a downward movement of the cam members 71 and 72 which is followed by downward movement of the plunger 53 as urged by the coil compression spring 63. The plunger 53 finally comes to rest when the underside of the head portion 61 engages the upper surface of the shock absorber washer or ring 65. In this position, as shown in Figure 5 of the drawings, the plunger ring 57 cuts off the passageway 15 from communication with the interior of the conduit 12. Also, as shown in Figure 5, the plunger 20 then moves on its return stroke in the direction indicated by the arrow 78.

As indicated hereinbefore, the injector apparatus shown in Figures 1 through 6 of the drawings and described hereinbefore is employed with other apparatus for making powdered milk. In Figure 7 of the drawings, there is illustrated one flow sheet which indicates the various steps that can be employed in this process. As there shown, a milk or milk derivative is passed to the liquid collector of the Gray-Jensen process or the vacuum pan of the Rogers process for removal of a part of the water contained in it. The partly condensed milk product then flows through a conduit, i. e., the conduit 12, Figure 1, to the injector where a vegetable product such as psyllium seed husks combined with sugar is injected into it. From the injector the combined product passes through a homogenizer which insures a thorough dispersion and fineness of mix. The product is then forced under relatively high pressure by a hydraulic pump through a spray drying chamber where the remaining water is removed by the blasts of air. The solids now in powdered form fall to the bottom of the spray drying chamber where they are collected for further processing as may be desired or are packaged for shipment.

In Figure 8 of the drawings, there is illustrated another flow sheet with which the injector apparatus shown in Figures 1 to 6 of the drawings can be employed. The ice cream, as it comes from a continuous ice cream freezer, is caused to flow through a conduit, i. e., the conduit 12, Figure 1, to the injector where one or several different kinds of foodstuffs can be injected into it. For example, as shown, fruits, jams, flavoring material, either liquid or dry, nut meats, etc., can be injected into the ice cream as it continuously passes through the conduit. It is then unnecessary to introduce these foodstuffs into the mix at the freezer and as a result it is possible to obtain a more uniform distribution of them in the resulting ice cream product.

It will be obvious that various changes can be made in the foregoing construction and methods without departing from the spirit and scope thereof. Accordingly, it will be understood that all matter shown in the accompanying drawings and described hereinbefore shall be interpreted as illustrative and not in a limiting sense.

We claim as our invention:

Apparatus for injecting solid, semi-solid or liquid foodstuff into a conduit through which a fluid or semi-fluid milk product flows under pressure comprising, in combination, a housing through which said conduit extends having a passageway opening into said conduit, a hopper communicating with said passageway for receiving the foodstuff and delivering the same thereto, a plunger reciprocable in said passageway for forcing on its forward stroke the foodstuff in said passageway into the milk product in said conduit, a crosshead fastened to said plunger, means slidably mounting said crosshead, a crankshaft, means interconnecting said crosshead and said crankshaft whereby the former is reciprocated on rotation of the latter, an additional plunger reciprocable in said housing in a passageway intersecting the first mentioned passageway, spring means biasing said additional plunger to a position cutting off connection of said first mentioned passageway with said conduit, and cam means operated by said crankshaft and cooperating with said additional plunger for moving the same away from said position thereof substantially at the beginning of the forward stroke of the first mentioned plunger and permitting said additional plunger to return to said position substantially at the end of said forward stroke.

FILIP L. SANNA.
CHARLES ALBERT SANNA.